INVENTORS.
Jacques Sejournet
Louis-Georges Leclerc

June 19, 1962  J. SEJOURNET ET AL  3,039,888
METHOD OF COATING THE BORE OF A HEATED HOLLOW BILLET
WITH GLASS-LIKE LUBRICATING MATERIAL PRIOR
TO EXTRUSION OF HOLLOW ARTICLES
Filed March 21, 1960  2 Sheets-Sheet 2

INVENTORS.
Jacques Sejournet
Louis-Georges Leclerc
BY

THEIR ATTORNEYS

United States Patent Office 3,039,888
Patented June 19, 1962

3,039,888
METHOD OF COATING THE BORE OF A HEATED HOLLOW BILLET WITH GLASS-LIKE LUBRICATING MATERIAL PRIOR TO EXTRUSION OF HOLLOW ARTICLES
Jacques Sejournet and Louis Georges Leclerc, Paris, France, assignors to Compagnie du Filage des Metaux et des Joints Curty, Paris, France, a corporation of France
Filed Mar. 21, 1960, Ser. No. 16,311
Claims priority, application France Mar. 27, 1959
2 Claims. (Cl. 117—18)

This invention relates to a method of coating the bore of a heated hollow billet with vitreous lubricating material prior to the extrusion of hollow articles.

In order to simplify the following description, reference will be made only to the extrusion of tubes but it is to be understood that the invention refers to the hot extrusion of all types of hollow profiles requiring the use of a die and mandrel with round or profiled cross sections.

In a known method of extruding metal tubes, a heated metal billet having a bore extending therethrough is placed in a container having a die located at its front end, a mandrel is entered into the bore of the billet and is moved forward until it extends out in front of the front end of the billet and comes into the plane of the die opening and then a punch is moved to force out the metal of the billet between two concentric walls, the outer wall being constituted by the die and the inner wall being constituted by the outer surface of the mandrel. The mandrel is often mounted on a separate ram and can move independently of the punch. The cross sections of the die and the mandrel can be circular or can be of any other shape.

In carrying out such an extrusion operation, the lubrication of the mandrel is accomplished by inserting a vitreous lubricant between the outer surface of the mandrel and the wall forming the bore of the billet. This is disclosed for instance in Sejournet et al. Patent No. 2,538,917.

Up to the present time, it has been endeavored to distribute the vitreous lubricant as regularly and evenly along the length of the billet bore as uniformly as possible. However, it has often been noted that there is insufficient lubrication toward the end of the extruding operation, this defect being accentuated when billets of great length are being extruded. Consequently, there is either a rapid wear on the rear part of the mandrel or there are defects in the inner surface of the extruded tube along the part of the tube which was last extruded. In order to overcome these defects, it has been a practice to stop the extrusion before the entire billet has been extruded, which involves the loss of metal.

The present invention overcomes these disadvantages. It consists essentially in depositing powdered vitreous lubricating material along the length of the bore of the heated billet in a non-uniform manner with respect to quantity or quality and thereafter rotating the billet about its longitudinal axis while in a substantially horizontal position to distribute the lubricating material around the wall of the bore. In one embodiment of the invention, the powdered vitreous lubricating material is deposited along the length of the bore of the heated billet in a non-uniform manner to provide a greater quantity of the lubricating material adjacent the rear end of the billet than adjacent the front end thereof. In another embodiment of the invention, two different powdered vitreous lubricating materials are deposited along the length of the bore of the heated billet, one lubricating material having a substantially higher viscosity than the other when heated to a given temperature, the lubricating material having the higher viscosity being located adjacent the rear end of the billet and the other lubricating material being located adjacent the front end of the billet. In either embodiment, after the powdered vitreous lubricating material has been deposited along the length of the bore of the heated billet in a non-uniform manner either with respect to quantity or quality, the billet is rotated about its longitudinal axis while in a substantially horizontal position in order to distribute the lubricating material around the wall of the bore. In carrying out this rotation of the billet in order to distribute the lubricating material around the wall of the bore, the billet can be rolled along an inclined plane or along a horizontal plane or it can be supported on rollers and rotated while in place on those rollers.

In the accompanying drawings which illustrate several embodiments of the invention, FIGURE 1 is a longitudinal section through parts of an extrusion press showing a tube being extruded from a container through a die, this figure illustrating a known method of extruding tubes, and the remaining FIGURES 2 through 10 are diagrammatic figures illustrating the present invention;

Figure 7:
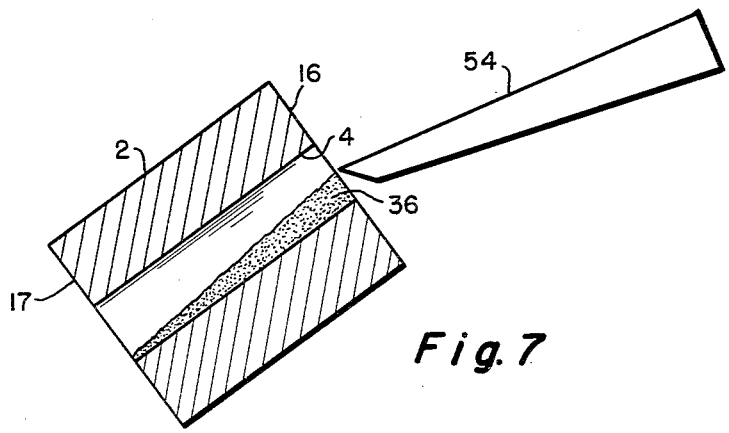
FIGURE 7 is a longitudinal section of a hollow billet showing a funnel for feeding vitreous lubricating material into the bore of the billet.
Figure 8:
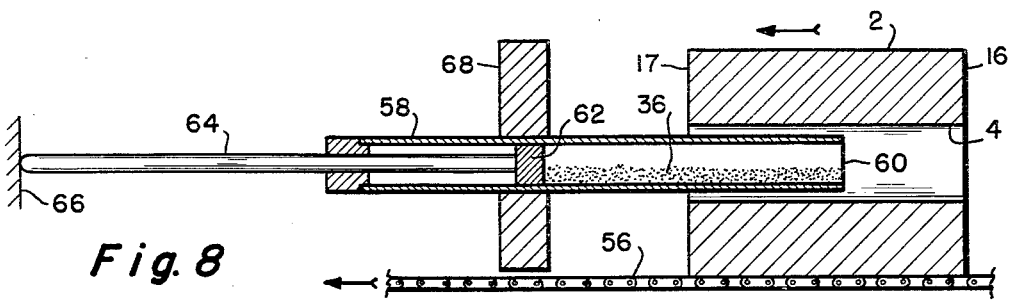
Figure 9:
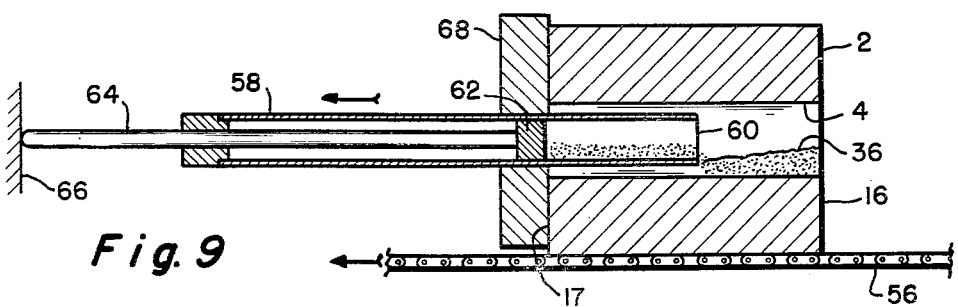
Figure 10:
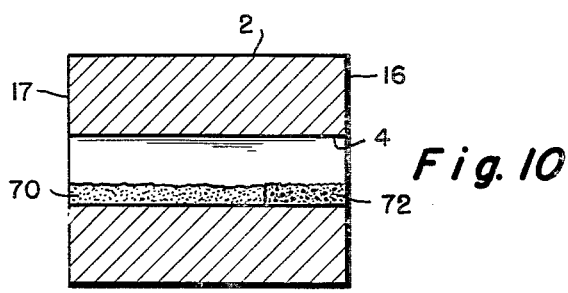

FIGURES 8 and 9 illustrate another embodiment of the invention, these two figures showing two different positions of the same apparatus used in carrying out the method; FIGURES 2–9 illustrate methods or apparatus for depositing powdered vitreous lubricating material along the length of the bore of the heated billet in a non-uniform manner to provide a greater quantity of the lubricating material adjacent the rear end of the billet than adjacent the front end of the billet; and FIGURE 10 is a longitudinal section through a billet illustrating the embodiment of the method in which two different powdered vitreous lubricating materials are deposited along the length of the bore of the heated billet, one lubricating material having a higher viscosity than the other when heated to a given temperature.

Figure 1:
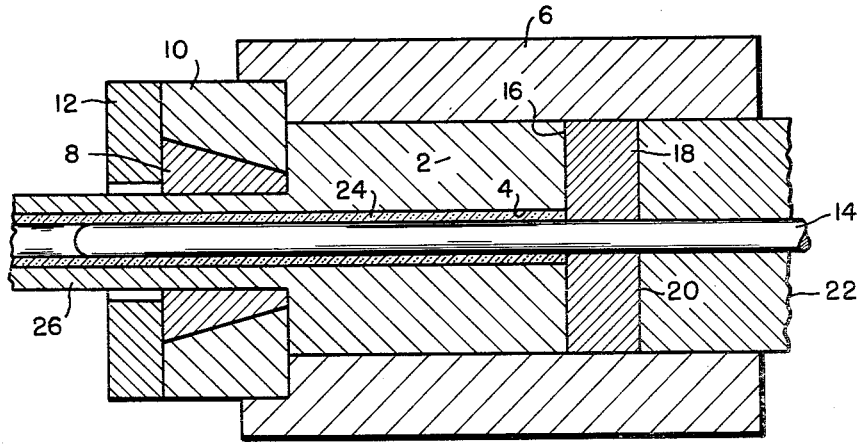

Referring now more particularly to the accompanying drawings and for the present to FIGURE 1, which illustrates the extrusion of a hollow billet to form a tube, a heated metal billet 2 having a bore 4 extending through it is placed in a container 6 having a die 8 located at its front end. The die is mounted in a die holder 10 and is backed by a backing plate 12. A mandrel 14 is entered into the bore 4 of the billet from its rear face 16 and the mandrel is moved forwardly until it lies in the plane of the die 8. Prior to moving the mandrel forwardly, a dummy block 18 is placed between the rear face 16 of the billet and the front face 20 of a plunger 22. Prior to entering the mandrel into the bore of the billet, the bore of the billet is provided with a layer 24 of vitreous lubricating material. The punch 22 is then moved forwardly, i.e., to the left as viewed in FIGURE 1, which extrudes a metal tube 26 between the die 8 and the mandrel 14. The arrangement and method just described are known in the prior art and are given herein merely for background information.

Figures 2, 3:
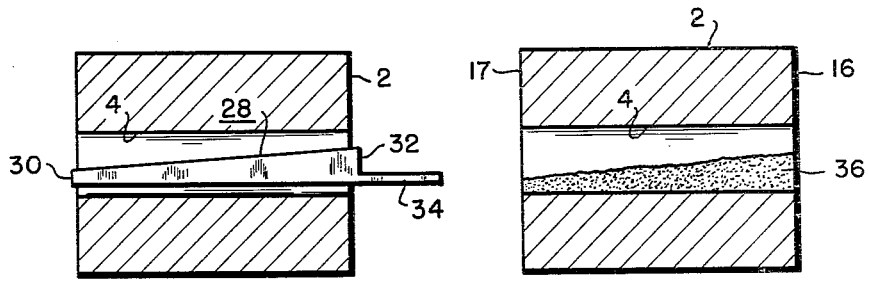
FIGURE 2 is a longitudinal section through a hollow metal billet showing a trough containing powdered vitreous lubricating material received in the bore of the billet and ready to be rotated to deposit the lubricating material in the bore of the billet.
FIGURE 3 is a section similar to FIGURE 2 showing the vitreous lubricating material deposited in the bore of the billet.
Figures 4, 5:
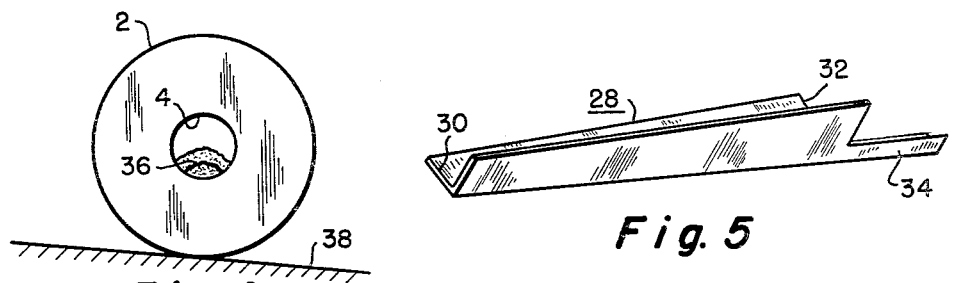
FIGURE 4 is an end view of a billet after vitreous lubricating material has been deposited in its bore, the billet being ready to be rolled down an inclined plane in order to distribute the lubricating material around the wall of the bore.
FIGURE 5 is a perspective view, on an enlarged scale, of the trough shown in FIGURE 2.

Referring to FIGURES 2 and 5, a trough indicated generally by reference numeral 28 is filled with powdered vitreous lubricating material, this trough being V-shaped in cross section and being shallower at its end 30 than at its end 32. The trough is provided with a handle 34. The trough filled with vitreous lubricating material is moved into the bore 4 of the billet as shown in FIGURE 2 and the trough is turned over, i.e., rotated about its axis to deposit the lubricating material along the length of the bore as shown in FIGURE 3 and the trough is withdrawn. The powdered lubricating material 36 is non-uniformly distributed along the length of the bore to provide a greater quantity of it adjacent the rear end 16 of the billet than adjacent the front end 17 of the billet.

The billet 2 is then rotated about its longitudinal axis while in a substantially horizontal position by causing it to roll along a support 38 which may be inclined, as indicated in FIGURE 4, or the billet may be supported on driving rollers (not shown) and rotated about its axis without moving with respect to the ground. In either event, the rotation of the billet distributes the lubricating material around the wall of the bore but in view of the fact that, as shown in FIGURE 3, the distribution of the lubricating material lengthwise of the bore is not uniform, after rotation of the billet about its axis, the bore of the billet is coated with a layer of the lubricating material, this layer being thicker at the rear end of the bore than at its front end.

Figure 6:
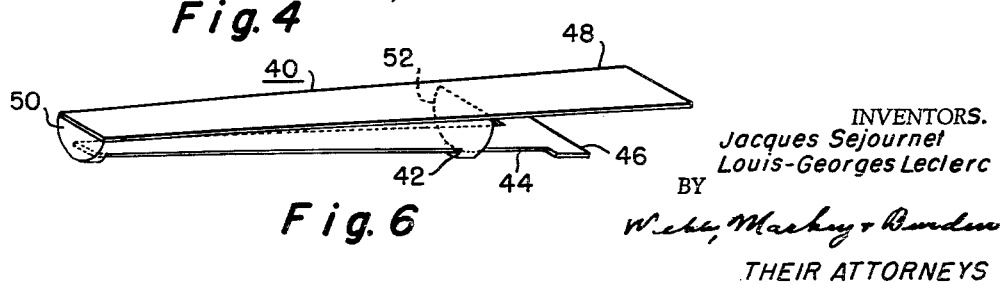
FIGURE 6 is a perspective view, on an enlarged scale, of a modified form of trough which can be used in place of the trough shown in FIGURE 5 for depositing vitreous lubricating material in the bore of the billet.

Instead of using a trough such as the trough 28 shown in FIGURE 5 for distributing powdered lubricating material in the bore of the billet, one may use a trough such as shown in FIGURE 6 and designated generally by reference numeral 40. This trough is provided with an open bottom 42 closed by a trap door 44 having an operating handle 46. The trough is provided with a hand grip 48. After filling the trough 40 with powdered vitreous lubricating material, it is entered into the bore of the billet as shown in FIGURE 2 and the trap door is operated to deposit the lubricating material in the bore of the billet. The trap door may be of a kind which is rotated in order to open or close it or of a kind which can be slid axially of the trough 40 in order to open or close the bottom of the trough. The trough can be made shallower at the end 50 than at the end 52 in order to deposit a greater amount of the lubricating material in the bore adjacent the rear end of the billet than adjacent the front end. After lubricating material has been deposited in the bore of the billet, the billet is rotated about its longitudinal axis as previously described to distribute the lubricating material around the wall of the bore.

Another method of distributing powdered lubricating material along the length of the bore of a billet is illustrated in FIGURE 7. As there shown, the heated billet 2 is arranged in an inclined position and powdered lubricating material 36 is poured from a funnel 54 into the bore 4 of the billet. Due to the viscosity of the lubricating material, the powder is distributed non-uniformly in such manner as to provide a greater quantity of the lubricating material adjacent the rear end 16 of the billet than adjacent the front end 17. The billet is then placed in a horizontal position and rotated about its longitudinal axis as previously explained in order to distribute the lubricating material around the wall of the bore.

FIGURES 8 and 9 illustrate another method of depositing powdered vitreous lubricating material along the length of the bore of a heated billet in a non-uniform manner to provide a greater quantity of the lubricant material adjacent the rear end of the billet than adjacent the front end thereof. A billet 2 is moved to the left as shown in FIGURE 8 while supported on an endless chain 56. A tube 58 filled with powdered vitreous lubricating material 36 is located in a position above the chain 56 at a level such that it can enter the bore 4 of the billet. The tube 58 is open at its front end 60. A piston 62 fits inside the tube 58, the piston having a piston rod 64 which abuts against a wall 66. Movement of the billet 2 to the left is stopped at a certain point when the billet abuts a fixed stop piece 68. When the billet abuts the fixed stop piece 68, an electric contact and mechanical means (not shown) cause the tube 58 to be moved to the left as shown in FIGURE 9. In this manner, the tube 58 is moved through the bore 4 while powdered lubricating material 36 in the tube is distributed along the length of the bore. The movement of the tube 58 through the bore of the billet is regulated so that a greater quantity of the lubricating material is deposited adjacent the rear end 16 of the billet than adjacent the front end 17. After the tube 58 has been withdrawn from the billet bore, the billet is removed from the chain 56 and is rotated about its longitudinal axis while in a substantially horizontal position to distribute the lubricating material around the wall of the bore. The tube 58 is then moved to its advanced position and is refilled with the powdered lubricating material so that it is ready to distribute powdered lubricating material along the bore of another billet.

As shown in FIGURE 10, the distribution of the powdered vitreous lubricating material along the bore of the billet is non-uniform with respect to quality rather than with respect to quantity. Thus in that figure, two different powdered vitreous lubricating materials 70 and 72 are distributed along the length of the bore 4 of the billet 2, the lubricating material 72 having a substantially higher viscosity than the lubricating material 70 when heated to a given temperature, the lubricating material 72 being located adjacent the rear end 16 of the billet and the lubricating material 70 being located adjacent the front end 17 of the billet. In the extrusion of stainless steel tubes, for example, one may use as the lubricating material 70, ordinary window glass powder and as the lubricating material 72, a powdered glass known as "Supremax" and having a substantially higher viscosity than the material 70 when heated to a given temperature. Preferably, the material 70 extends from the front end 17 of the billet for a distance of about ⅔ of the length of the bore, the material 72 extending for about ⅓ of the length of the bore.

A typical window glass composition which may be used as the lubricating material 70 is as follows:

| | Percent |
|---|---|
| $SiO_2$ | 71.5 |
| $Al_2O_3$ | 1.5 |
| $Na_2O$ | 14 |
| $CaO$ | 13 |

The lubricating material 72, of higher viscosity when heated to a given temperature, is of the following approximate composition:

| | Percent |
|---|---|
| $SiO_2$ | 80 |
| $B_2O_3$ | 12.5 |
| $Al_2O_3$ | 2 |
| $Na_2O$ | 3.3 |
| $K_2O$ | 1.4 |

As illustrated in FIGURE 3, a greater quantity of the lubricating material 36 is provided adjacent the rear end of the billet than adjacent the front end thereof whereas, according to FIGURE 10, the depth of the layer 70 is approximately equal to the depth of the layer 72. If desired, one can combine these two methods, i.e., a greater quantity of the lubricating material can be provided adjacent the rear end of the billet than adjacent the front end thereof and at the same time the lubricating material adjacent the rear end of the billet may be of a kind which has a higher viscosity than that adjacent the front end thereof when heated to a given temperature.

The invention is not limited to the preferred embodiments but may be otherwise embodied or practiced within the scope of the following claims.

We claim:

1. In a method of extruding hollow articles wherein a heated metal billet having a bore extending therethrough is extruded from a container between a die and a mandrel and in which the bore of the billet is coated with a layer of vitreous lubricating material, the improved method of coating the bore of the billet with a layer of vitreous lubricating material, which comprises depositing powdered glass lubricating material along the length of the bore of the heated billet in a non-uniform manner to provide a greater quantity of said lubricating material adjacent the rear end of the billet than adjacent the front end of the billet, and thereafter rotating the billet about its longitudinal axis while in a substantially horizontal position to distribute the lubricating material around the wall of the bore.

2. In a method of extruding hollow articles wherein a heated metal billet having a bore extending therethrough is extruded from a container between a die and a mandrel and in which the bore of the billet is coated with a layer of vitreous lubricating material, the improved method of coating the bore of the billet with a layer of vitreous lubricating material, which comprises depositing two different powdered glass lubricating materials along the length of the bore of the heated billet, one lubricating material having a substantially higher viscosity than the other when heated to a temperature above the melting point of the glass lubricating material, the lubricating material having the higher viscosity being located adjacent the rear end of the billet and the other lubricating material being located adjacent the front end of the billet, and thereafter rotating the billet about its longitudinal axis while in a substantially horizontal position to distribute the lubricating material around the wall of the bore.

References Cited in the file of this patent
UNITED STATES PATENTS

| | | |
|---|---|---|
| 862,285 | Schmidt | Aug. 6, 1907 |
| 2,737,461 | Heisler et al. | Mar. 6, 1956 |
| 2,908,384 | Capron et al. | Oct. 13, 1959 |